United States Patent
Ignacio

(10) Patent No.: US 7,611,160 B1
(45) Date of Patent: Nov. 3, 2009

(54) RETRACTABLE SINGLE-MOTION LEVER JACK

(76) Inventor: Roy M. Ignacio, 32 Kings Path, Columbus, MS (US) 39702

(*) Notice: Subject to any disclaimer, the term of this patent is extended or adjusted under 35 U.S.C. 154(b) by 170 days.

(21) Appl. No.: 11/760,324

(22) Filed: Jun. 8, 2007

Related U.S. Application Data

(60) Provisional application No. 60/812,216, filed on Jun. 9, 2006.

(51) Int. Cl.
- B60S 9/04 (2006.01)
- B60D 1/66 (2006.01)
- B60S 9/18 (2006.01)

(52) U.S. Cl. .................. 280/475; 280/766.1; 280/763.1; 254/423; 254/418

(58) Field of Classification Search .................. 254/420, 254/116, 118, 119, 418, 423, 425, 427; 280/763.1, 280/475, 766.1
See application file for complete search history.

(56) References Cited

U.S. PATENT DOCUMENTS

| | | | | |
|---|---|---|---|---|
| 187,707 A | * | 2/1877 | Gaillard Jr. | 254/116 |
| 190,718 A | * | 5/1877 | Johnson | 254/118 |
| 293,946 A | * | 2/1884 | Carpenter | 254/116 |
| 348,480 A | * | 8/1886 | Souders | 254/118 |
| 498,246 A | * | 5/1893 | Delong | 254/118 |
| 696,558 A | * | 4/1902 | Goodwin | 254/116 |
| 1,151,106 A | * | 8/1915 | Johnston et al. | 254/116 |
| 1,158,192 A | * | 10/1915 | Ette | 254/118 |
| 1,208,285 A | * | 12/1916 | Burkholder | 254/116 |
| 1,462,040 A | * | 7/1923 | McKone | 254/2 B |
| 2,153,722 A | * | 4/1939 | Loughmiller | 254/420 |
| 2,345,789 A | * | 4/1944 | Brooks | 280/763.1 |
| 2,378,836 A | * | 6/1945 | Coffing | 254/133 R |
| 3,281,160 A | * | 10/1966 | Vinther et al. | 254/420 |
| 3,595,527 A | * | 7/1971 | Douglass | 254/420 |
| 4,889,357 A | * | 12/1989 | Perry | 280/475 |
| 4,978,104 A | * | 12/1990 | Gipson, Jr. | 254/420 |
| 5,421,555 A | * | 6/1995 | Sims | 254/420 |
| 2006/0214147 A1 | * | 9/2006 | Meissner | 254/420 |

FOREIGN PATENT DOCUMENTS

GB 2175858 A * 12/1986

* cited by examiner

Primary Examiner—Lesley D. Morris
Assistant Examiner—Wesley Potter
(74) Attorney, Agent, or Firm—B. Craig Killough

(57) ABSTRACT

A lever actuated jack may be mounted to a trailer. An inner jack tube slidably engages the outer jack tube. A lever is attached to the upper end of the inner jack tube, or to an inner support bracket that communicates with an upper portion of the inner jack tube. The lever is pivoted, applying a downward force to the inner jack tube, which pushes the tongue of the trailer up to elevate the tongue of the trailer as required. The lever is sufficiently long to provide adequate mechanical advantage to force the tongue of a loaded trailer upwardly the required distance. The lever may be pivoted in the opposite direction to lower the tongue of the trailer by pulling the inner jack tube within the outer jack tube.

14 Claims, 8 Drawing Sheets

US 7,611,160 B1

RETRACTABLE SINGLE-MOTION LEVER JACK

CROSS-REFERENCE TO RELATED APPLICATIONS

The contents of Provisional Application U.S. Ser. No. 60/812,216, filed Jun. 9, 2006, entitled "LEVER JACK," on which the present application is based and benefit claimed under 35 U.S.C. §119(e), is herein incorporated by reference.

FIELD OF THE INVENTION

This invention relates to jacks that are used for lifting.

BACKGROUND OF THE INVENTION

Jacks are commonly affixed to trailers. A jack may be affixed to a trailer near the tongue of a trailer, and near the point of attachment of the trailer to a vehicle. A jack allows the tongue of the trailer to be elevated above the ball or other connection point on the trailer hitch of the vehicle. A ball may be positioned underneath the tongue of the trailer while the jack holds the tongue of the trailer in an elevated position. The jack is used to lower the tongue of the trailer onto the ball of the trailer hitch for connection of the trailer to the vehicle. When the trailer is disconnected from the vehicle, the jack is used to raise the tongue of the trailer hitch above a ball or other connection point on the vehicle, so that the vehicle can be driven away without the trailer.

Trailer jacks in common use are elevated and lowered by a winding mechanism. The winding mechanism may be a gear and pinion, or a screw-type threaded member. In order to gain the necessary mechanical advantage, it takes many rotations of the handle of the jack to elevate or lower the jack the required distance to elevate the tongue of the trailer away from the trailer hitch, or to lower the tongue of the trailer onto the trailer hitch of the vehicle. Such jacking devices are slow and time consuming, and may be fatiguing to the user, due to the number of rotations of the handle that are required to lower or elevate the tongue of the trailer.

There is a need for a device that will quickly, easily and simply elevate and lower the tongue of a trailer.

SUMMARY OF THE PRESENT INVENTION

The present invention is a lever actuated jack that may be mounted to a trailer. In one embodiment, an elongated member, which may be an inner jack tube slidably engages another elongated member, which may be the outer jack tube. A lever is attached to the upper end of the inner jack tube, or to an inner support bracket that communicates with an upper portion of the inner jack tube. The lever is pivoted, applying a downward force to the inner jack tube, which pushes the tongue of the trailer up to elevate the tongue of the trailer as required. The lever is sufficiently long to provide adequate mechanical advantage to force the tongue of a loaded trailer upwardly the required distance. The lever may be pivoted in the opposite direction to lower the tongue of the trailer by pulling the inner jack tube within the outer jack tube.

DETAILED DESCRIPTION OF THE PREFERRED EMBODIMENTS

Figure 1:
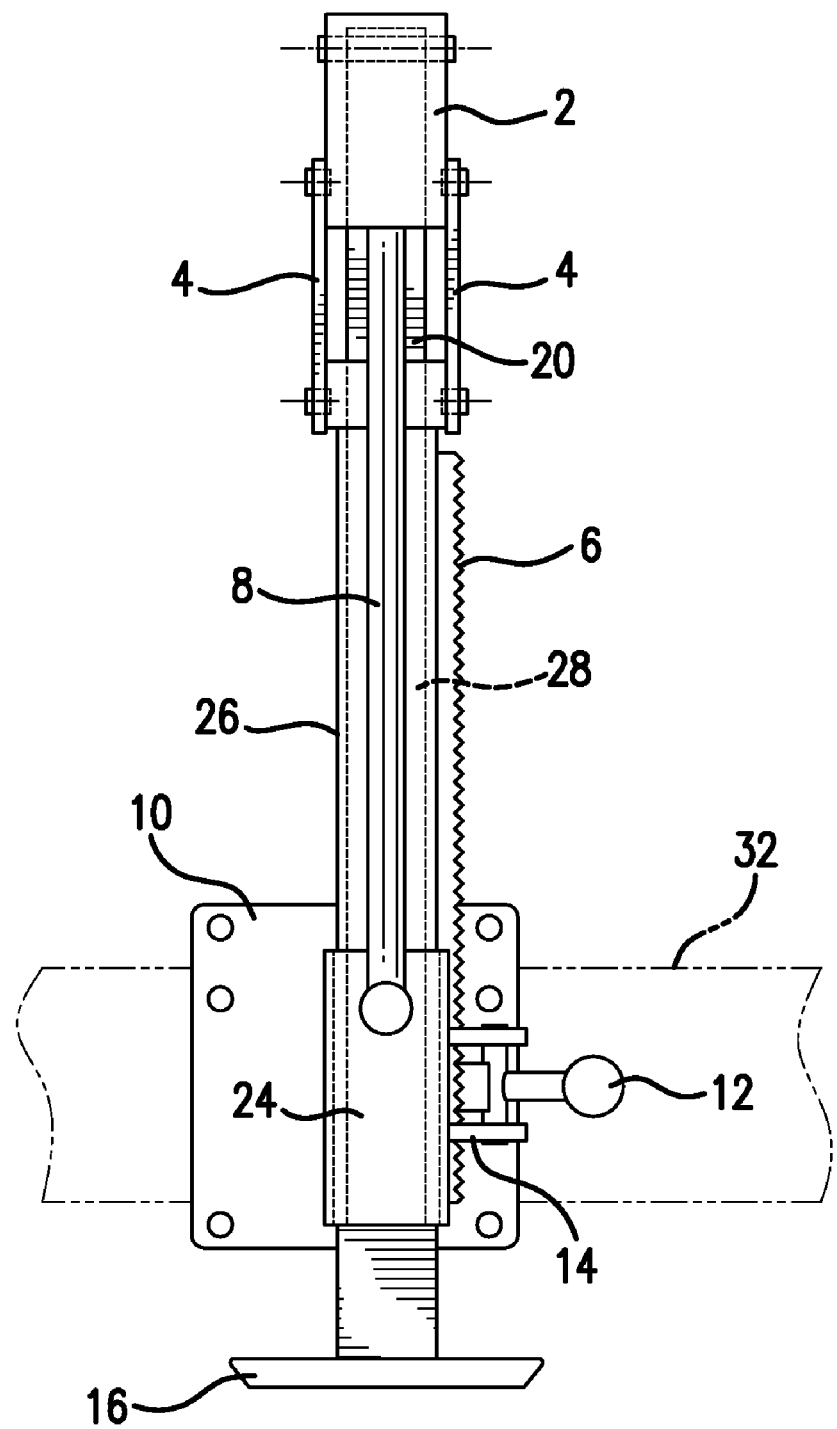
FIG. 1 is a front elevation of the device.
Figure 2:
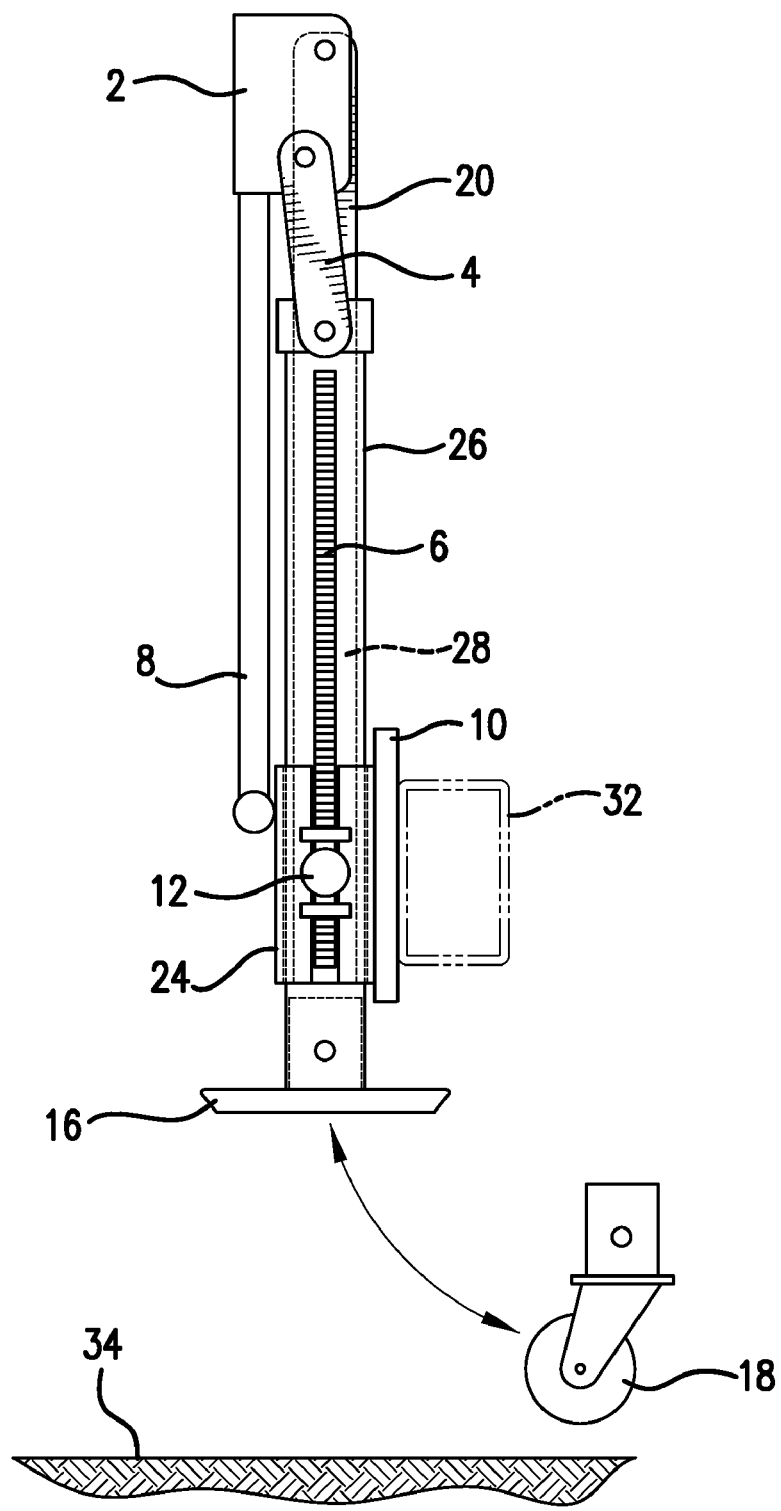
FIG. 2 is a side elevation of the device.

Referring now to the drawing Figures, FIG. 1 and FIG. 2 show the jack in the retracted position. The jack may be mounted to a tongue of a trailer 32, with the foot or base 16 of the jack retracted so that it is not in contact with the ground, pavement or other supporting surface 34. The jack, in the stowed position, shown in FIGS. 1 and 2, may be mounted at the jack positioning tube 24 to a trailer tongue 32 using fasteners, such as U-bolts.

Figure 3:
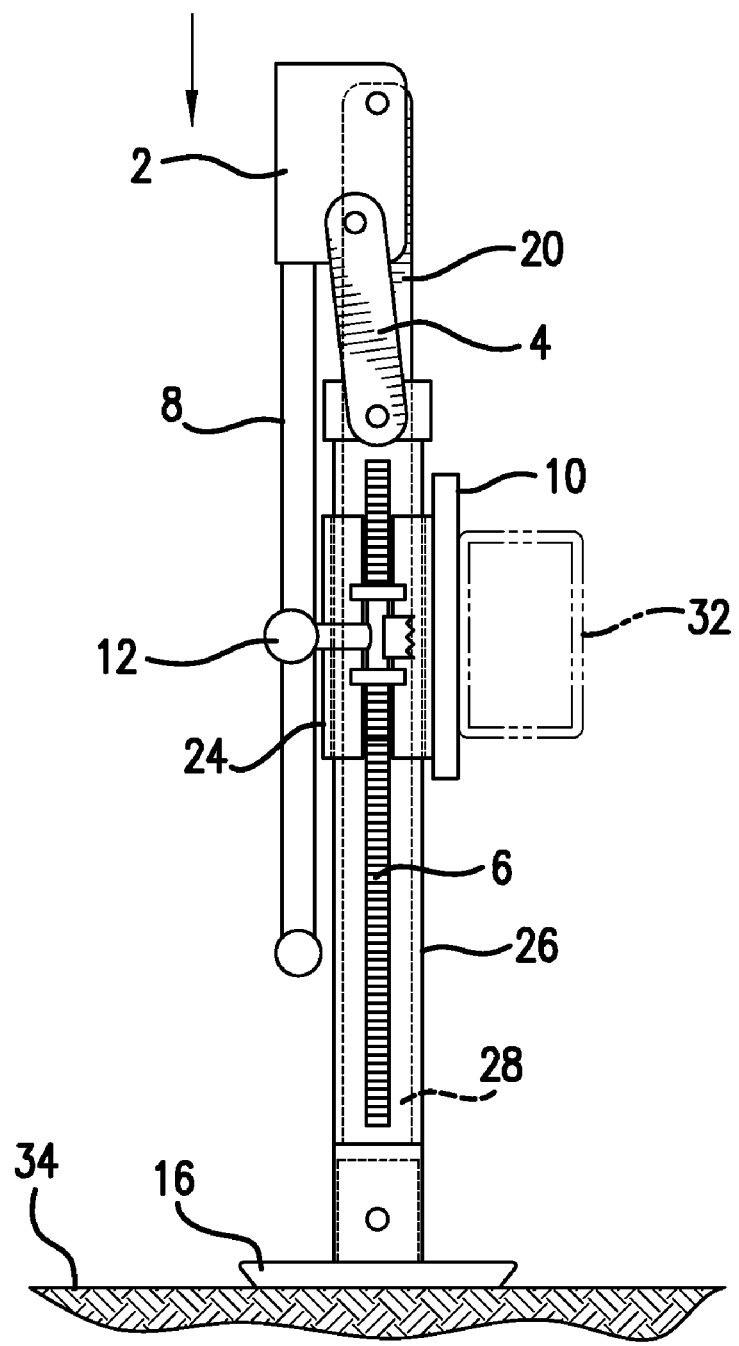
FIG. 3 is a side elevation of the device of FIG. 2 with an elongated member moved downwardly to a supporting surface.

In FIG. 3, the jack base 16 is lowered to the ground or other supporting surface. In a preferred embodiment, a locking mechanism is released, and the base and the associated elongated tube 26, and other components, fall by gravitational pull until the base contacts the supporting surface, when the tongue of the trailer is elevated and supported by the trailer hitch of the vehicle, or by a similar support. The assembly, comprised of an elongated tube, which may be an outer tube 26, another elongated tube, which may be inner tube 28, inner tube support bracket 20, actuator bracket 2 and positioning lever 8, has moved vertically downward relative to the assembly comprising the jack positioning tube 24 and the gear lock mount 14. The gear lock 12 is pulled to disengage it from the gear rack 6. This disengagement allows the assembly comprising the inner and outer jack tube, the positioning lever and other components to drop vertically by gravity. This action is demonstrated by the repositioning of the jack from the position of FIG. 6 to the position of FIG. 7. The use of gravitational free fall in the preferred embodiment means that the base is not positioned against the ground or other supporting surface such as by winding a rack and pinion system, although the base could be lowered to the supporting surface by a rack and pinion system or other gear or screw system, or by a hydraulically actuated system, or other known jacking devices. Such devices are more complex and are more time consuming than gravitational free fall, and in most applications, are unnecessary due to the improvement of the present invention.

Figure 7:
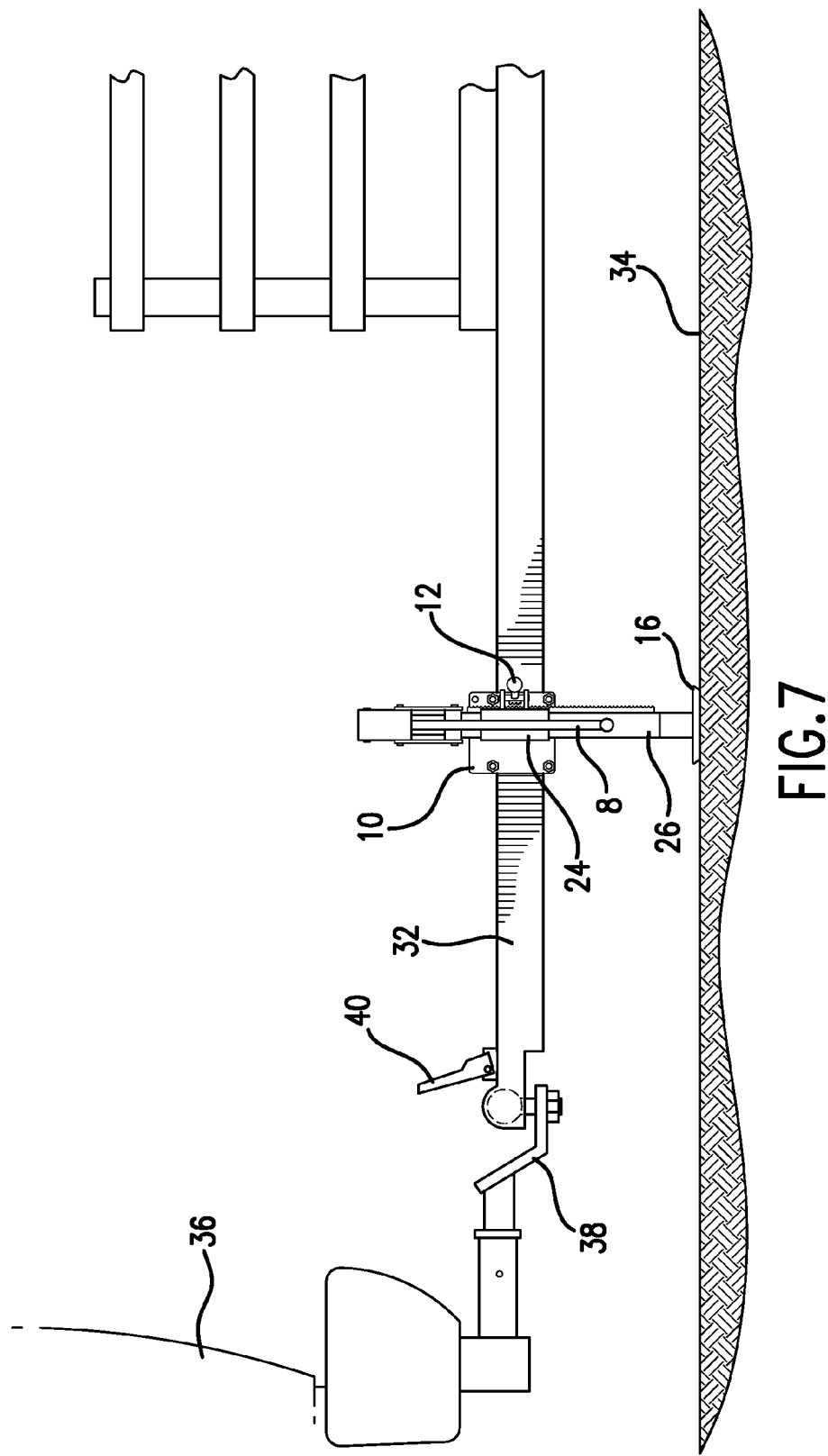

The gear lock 12 is preferred to be spring-loaded, so that when the lock mount is released, the gear lock will again engage the gear lock and hold the assembly in place relative to the jack positioning tube 24, as shown in FIGS. 3 and 7.

Figure 4:
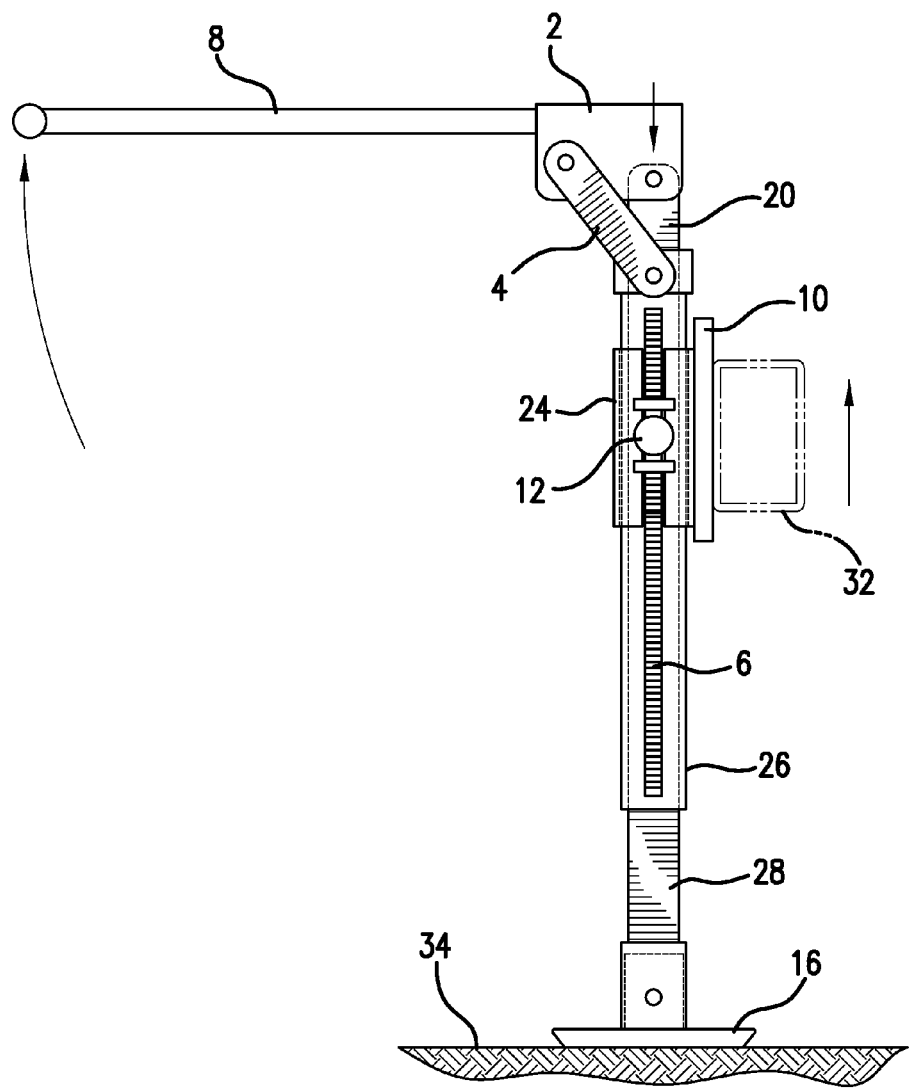
FIG. 4 is a side elevation of the lever jack, with the positioning lever pivoted from a downward position to an intermediate position, and another elongated member extending downwardly from other elongated member.
Figure 5:
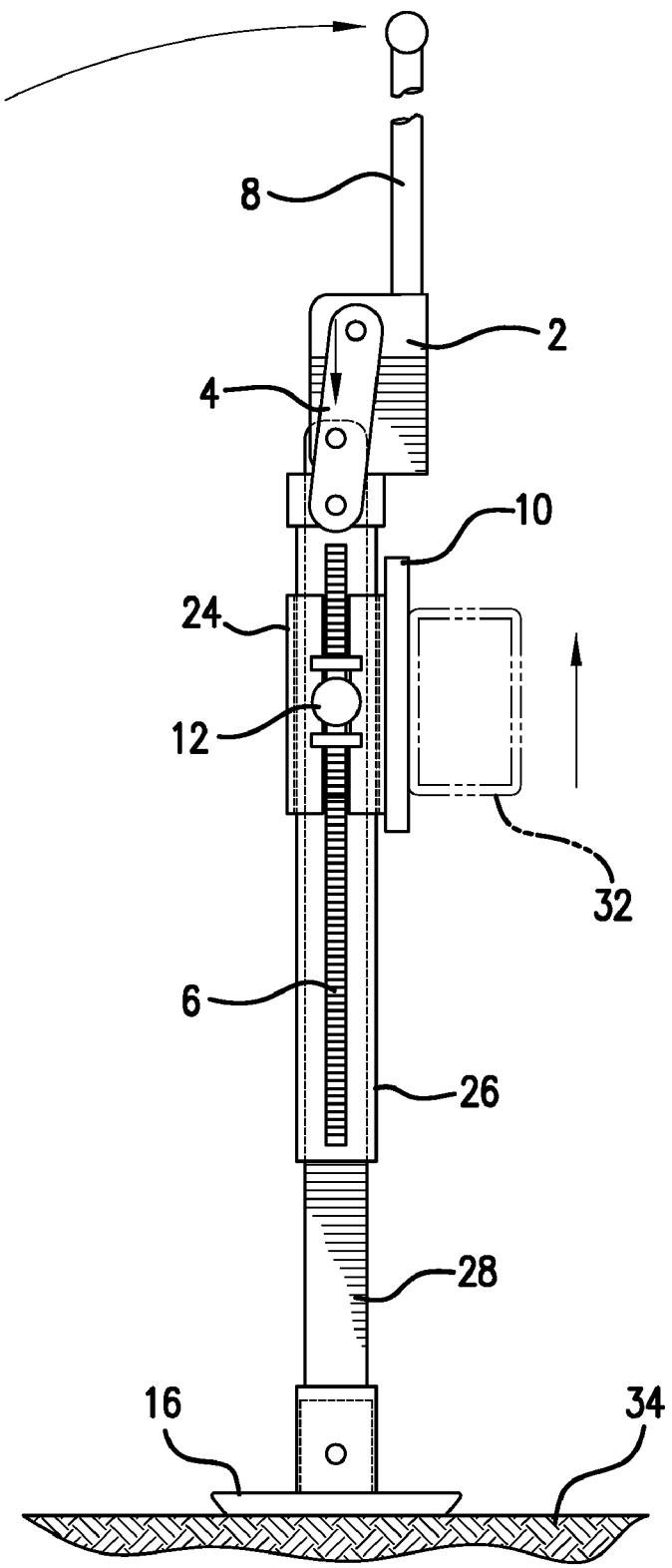
FIG. 5 is a side elevation of the lever jack, with the positioning lever pivoted fully upwardly and the elongated member extending fully.
Figure 8:
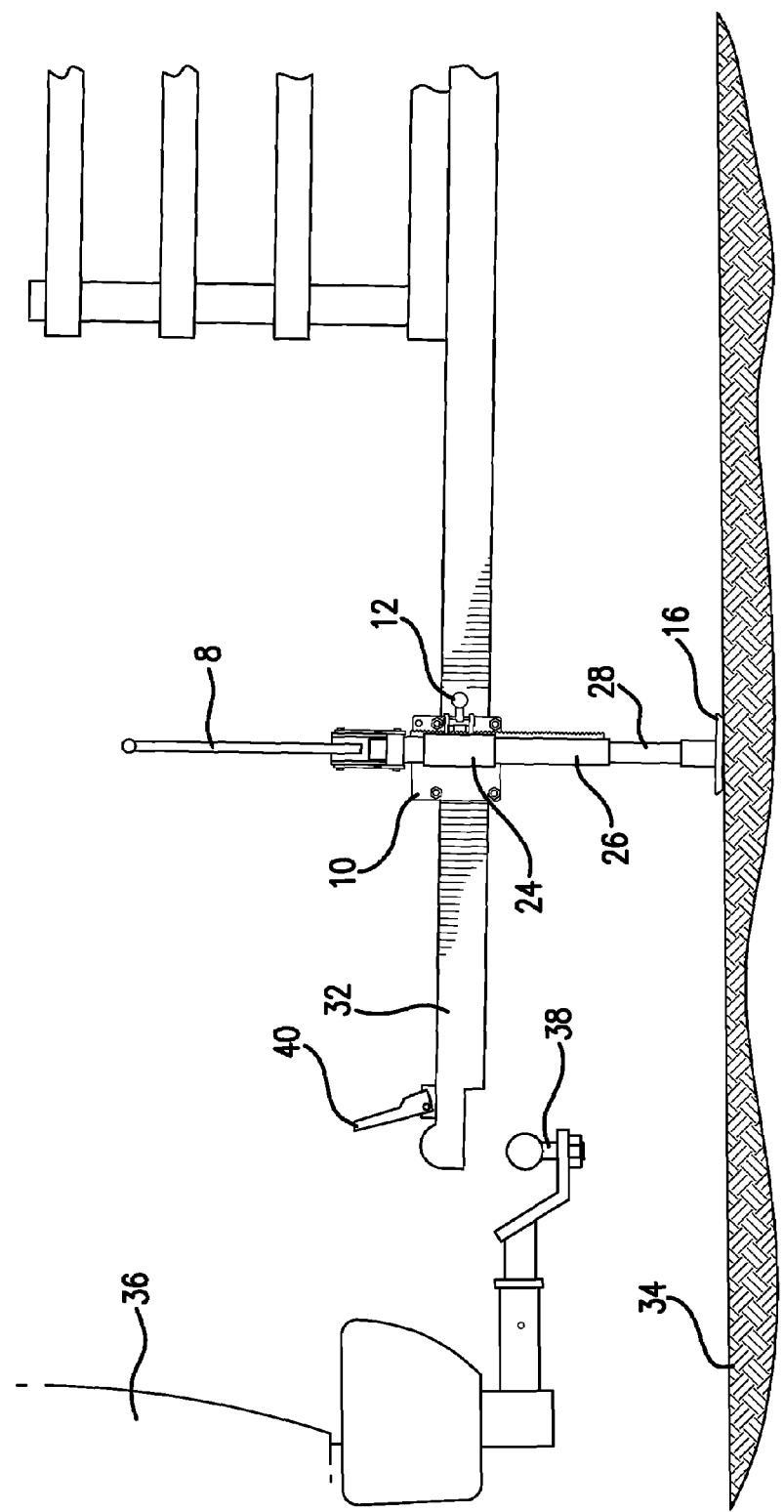

The object to be lifted, such as the tongue of a trailer, is now elevated by pivoting the positioning lever 8. As the positioning lever 8 is moved from the position shown in FIG. 3 to the position shown in FIG. 4, and subsequently, FIG. 5, the lever progressively forces the inner jack tube 28 out of the outer jack tube 26. The inner jack tube slides within the outer jack tube in a preferred embodiment. The rotation of the positioning lever pushes the inner tube support bracket 20 vertically downward, which forces the inner jack tube to telescope out from the outer jack tube, pushing the foot of the device down as shown in FIG. 4 and FIG. 5. As the positioning lever is rotated from the position of FIG. 3 to the position of FIG. 6, the foot or base will remain on the supporting surface, and the inner jack tube will have the effect of pushing the tongue of the trailer upwardly. FIG. 8. A wheel 18 or caster may be mounted to the base.

The positioning lever is sufficiently long to provide the necessary mechanical advantage to manually move a tongue of a trailer exerting several hundred pounds of force on the jack. Sufficient extension of the inner jack tube, and the associated elevation, may be obtained by rotating the positioning lever approximately 180°, as shown in FIGS. 3 through 5. Elevating the jack can be achieved by the single swift motion of rotating the lever 180°, or less, but at least 90°. This swift rotation of the lever is much more efficient than numerous turns of a crank on a traditional jack, especially jacks that are associated with trailer mounting.

The lever engages the inner tube through a cam mechanism to push against the inner tube and attached base to lift the object. While the cam action could take various forms, in a preferred embodiment, the lever comprises an actuator bracket 2 that is pivotally mounted to an inner tube support bracket 20. The inner tube support bracket is mounted above the inner tube to push the inner tube downwardly as the lever is rotated, and to pull the inner tube up when then lever is rotated in an opposite direction. The inner tube support bracket slidably traverses an upper portion of the outer jack tube.

In a preferred embodiment, the actuator bracket is connected to the outer tube by one or more pivot arms. As shown, the jack has a pivot arm 4 on opposite sides of the jack. The actuator arms are pivotally connected at each end by pivot points to the actuator bracket and to the outer jack tube. The actuator arms assist with controlling movement of the lever and the inner jack tube.

After the assembly is lowered to the supporting surface, but prior to actuating the lever and inner tube, the assembly is locked relative to the mount 10. Various locking devices may be used, such as a series of holes or voids into which a pin is inserted. However, it is preferred that finer control of the height is available, due to the varying heights of, for example, trailer tongues, and further, the possibility that the supporting surface will not always be of a consistent distance from the trailer mount. As shown in the preferred embodiment, the locking mechanism comprises a gear rack 6 having a plurality of relatively closely spaced teeth that provide the ability to lock the assembly in place quickly, with the base against the supporting surface. The lock pin engages the teeth quickly once the base falls into position against the ground. The locking device is preferred to allow the base to be positioned within a centimeter or less from one position to the next adjoining position.

Figure 6:
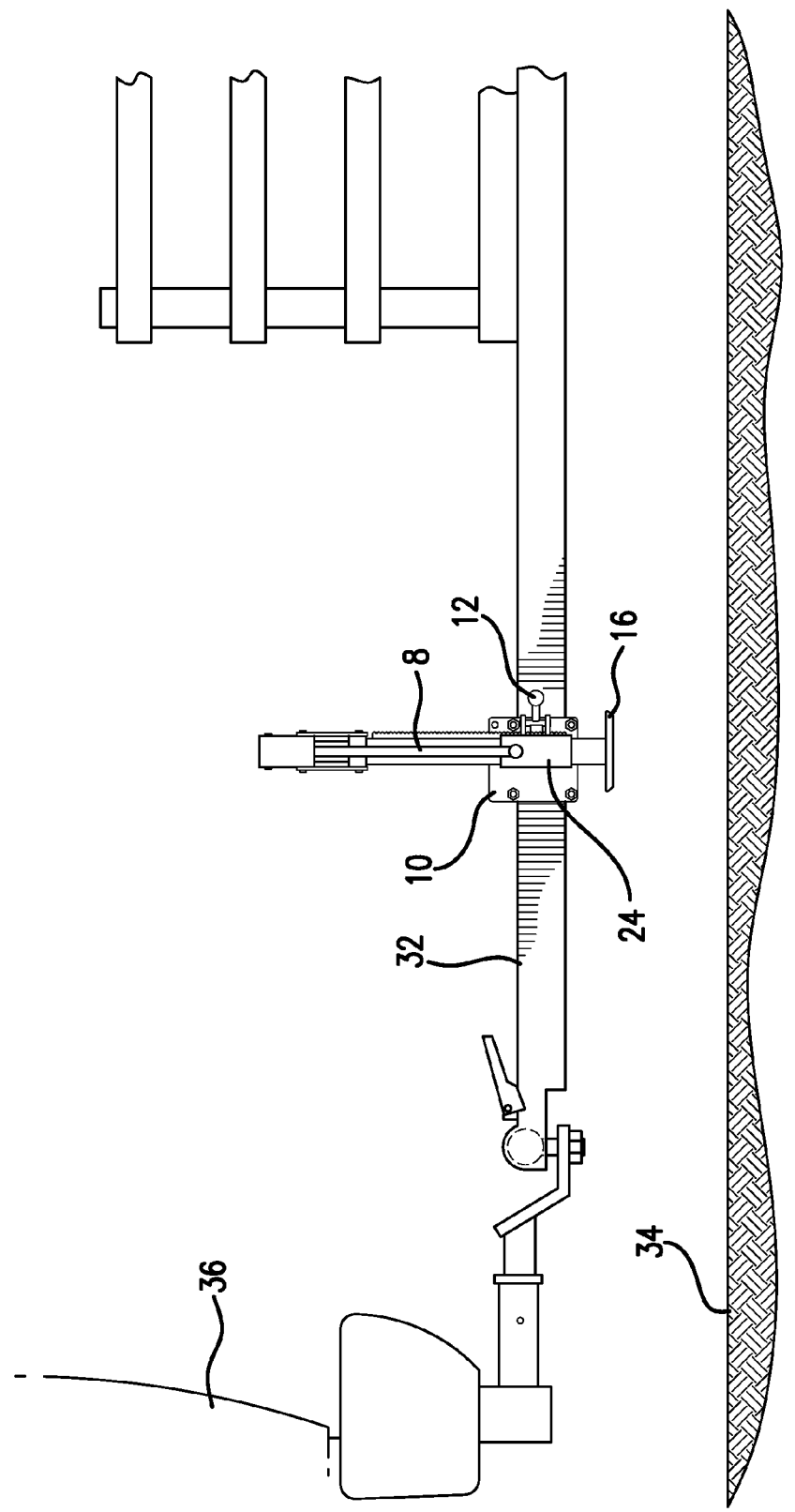
FIGS. 6, 7 and 8 demonstrate the jack of the present invention in use to elevate a tongue of a trailer from a trailer hitch.

In one mode, the jack of the invention is mounted to a trailer tongue. FIG. 6. The tongue is mounted to a trailer hitch 38 of a vehicle 36. The jack, and the base are elevated above the supporting surface, so that the jack does not interfere with the travel of the vehicle and the attached trailer.

To remove the trailer from the vehicle, the lock is released to allow the assembly to drop until the supporting base 16 strikes the ground. FIG. 7. The lock is engaged to secure the assembly in position relative to the mount and the trailer. The release 40 for the trailer hitch is positioned for removal of the trailer hitch from the vehicle.

The lever is now rotated from the position of FIG. 3 to the position of FIG. 5, forcing the inner tube to slide or move relative to the outer tube, which is locked against the mount, which pushes the tongue of the trailer up and away from the trailer hitch. FIG. 8. The vehicle may now be driven away without the trailer. The trailer may be reattached by reversing the process, and according to FIGS. 8, 7 and 6. The process is substantially less time consuming than the gear based winding systems used with trailer jacks.

What is claimed is:

1. A jack, comprising:
   a) a mount that is connected to an article to be lifted;
   b) a first elongated member, wherein said mount engages a side of said first elongated member, and said elongated member traverses said mount along a side of said first elongated member;
   c) a second elongated member that slidably engages said first elongated member, wherein a lower end of said second elongated member is extendable from a lower end of said first elongated member and below said first elongated member;
   d) a lever;
   e) a first pivotal mounting for mounting said lever in communication with said second elongated member; and
   f) a pivot arm that is pivotally mounted at one end of said pivot arm to said lever and an opposite end of said pivot arm is pivotally mounted to said first elongated member near an upper end of said first elongated member and below said first pivotal mounting;
   wherein rotation of said lever by said pivotal mounting pushes said second elongated member and forces said second elongated member to slide downwardly relative to said first elongated member, wherein a lower end of said second elongated member contacts a supporting surface, and pushes said mount upwardly.

2. A jack as described in claim 1, wherein said lever is capable of rotation from a first position that is substantially parallel with said second elongated member to a second position that is substantially parallel to said second elongated member.

3. A jack as described in claim 1, wherein said second elongated member travels within an interior of said first elongated member, and said second elongated member extends through a length of said first elongated member from an upper end of said first elongated member to a lower end of said first elongated member.

4. A jack as described in claim 1, wherein said mount further comprises a lock for locking a position of said first elongated member relative to said mount.

5. A jack as described in claim 1, wherein said lever is capable of rotation from a first position through a range that is more than 90 degrees to a second position.

6. A jack as described in claim 1, wherein said mount comprises a lock for locking a position of said first elongated member relative to said mount, wherein said lock comprises a plurality of teeth and said first elongated member comprises a plurality of teeth on a side thereof, and said teeth of said mount engage teeth of said first elongated member.

7. A jack as described in claim 1, wherein said first elongated member traverses said mount along a side of said first elongated member and in a direction that is generally parallel to a longitudinal axis of said first elongated member.

8. A jack as described in claim 1, wherein said side of said first elongated member is attached by said mount to a tongue of a trailer, and wherein said tongue of said trailer is moved upwardly as said lower end of the second elongated member extends beyond and away from said lower end of the first elongated member by rotation of the lever.

9. A jack as described in claim 1, wherein said first elongated member has a rack of teeth formed on a side thereof, and said mount engages said rack of teeth on said side of said first elongated member, and said elongated member traverses said mount along a side of said first elongated member as said mount progressively engages said teeth.

10. A jack as described in claim 1, wherein first elongated member is tubular, and said second elongated member travels within an interior of said tubular first elongated member, and said second elongated member extends through a length of said first elongated member from above an upper end of said first elongated member and through and below a lower end of said first elongated member.

11. A jack as described in claim 1, wherein the first elongated member is tubular and comprises a continuous central void that opens at an upper end and at a lower end.

12. A jack, comprising:
   a) a mount that is connected to an article to be lifted;
   b) a first elongated member, wherein said mount engages said first elongated member;
   c) a second elongated member that slidably engages and travels within an interior of said first elongated member, wherein an upper end of the second elongated member extends from an upper end of the first elongated member and a lower end of the second elongated member is extendable from a lower end of said first elongated member and below the first elongated member;
   d) a lever;
   e) a first pivotal mounting for mounting said lever in communication with said second elongated member; and
   f) a pivot arm that is pivotally mounted at one end of said pivot arm to said lever and an opposite end of said pivot arm is pivotally mounted to said first elongated member near an upper end of said elongated member and below said first pivotal mounting;
wherein rotation of said lever by said pivotal mounting pushes the upper end of the second elongated member and forces the second elongated member to slide downwardly relative to said first elongated member, wherein a lower end of said second elongated member contacts a supporting surface, and pushes said mount upwardly.

13. A jack as described in claim 12, wherein said first elongated member traverses said mount along a side of said first elongated member and in a direction that is generally parallel to a longitudinal axis of said first elongated member.

14. A jack as described in claim 12, wherein said a side of said first elongated member is attached by said mount to a tongue of a trailer, and wherein said tongue of said trailer is moved upwardly as said lower end of the second elongated member extends beyond and away from said lower end of the first elongated member by rotation of the lever.

* * * * *